United States Patent
Hayashi et al.

(10) Patent No.: US 7,702,332 B2
(45) Date of Patent: Apr. 20, 2010

(54) LOCATION REGISTER AND ACCOMMODATION TRANSFER CONTROL METHOD

(75) Inventors: Yasuhisa Hayashi, Yokohama (JP); Hiroshi Kawakami, Yokosuka (JP); Wataru Takita, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 762 days.

(21) Appl. No.: 11/503,128

(22) Filed: Aug. 14, 2006

(65) Prior Publication Data

US 2007/0049271 A1 Mar. 1, 2007

(30) Foreign Application Priority Data

Aug. 23, 2005 (JP) .......................... P2005-241353

(51) Int. Cl.
*H04W 4/00* (2009.01)
*H04W 24/00* (2009.01)

(52) U.S. Cl. .................. 455/433; 455/456.1; 455/435.1

(58) Field of Classification Search ................. 455/433, 455/456.1, 435.1
See application file for complete search history.

(56) References Cited

U.S. PATENT DOCUMENTS

| | | | | |
|---|---|---|---|---|
| 5,825,759 A | * | 10/1998 | Liu | ............................. 370/331 |
| 6,018,573 A | * | 1/2000 | Tanaka | ................... 379/211.02 |
| 6,138,016 A | | 10/2000 | Kulkarni et al. | |
| 6,594,490 B1 | * | 7/2003 | Toyoda et al. | ................ 455/433 |
| 6,731,621 B1 | * | 5/2004 | Mizutani et al. | ............ 370/338 |
| 6,950,876 B2 | * | 9/2005 | Bright et al. | ................. 709/230 |
| 2001/0046859 A1 | * | 11/2001 | Kil | .............................. 455/426 |
| 2004/0082332 A1 | | 4/2004 | McCann et al. | |
| 2005/0070283 A1 | * | 3/2005 | Hashimoto et al. | ........ 455/435.1 |

FOREIGN PATENT DOCUMENTS

| | | |
|---|---|---|
| JP | 11-18135 | 1/1999 |
| JP | 2001-298766 | 10/2001 |
| WO | WO 99/27734 | 6/1999 |

* cited by examiner

*Primary Examiner*—Rafael Pérez-Gutiérrez
*Assistant Examiner*—Allahyar Kasraian
(74) *Attorney, Agent, or Firm*—Oblon, Spivak, McClelland, Maier & Neustadt, L.L.P.

(57) ABSTRACT

HLR installed in an environment in which there are a plurality of mobile communication networks, is provided with a whole managed object manager for storing and managing subscriber number IDs and HLR information to manage the subscriber number IDs, in correspondence to each other; a subscriber data manager for storing and managing subscriber number IDs registered as managed objects of the host HLR and subscriber data of the subscriber numbers in correspondence to each other; and a determination controller for determining whether subscriber management information (subscriber number IDs and subscriber data) of managed objects in the host HLR is to be transferred to another HLR, based on criterion information such as current subscriber management information volume and accommodation capacity information, and for, when the transfer is necessary, determining a recipient HLR and subscriber management information of a transferred object, based on the criterion information in each HLR and a predetermined standard.

9 Claims, 11 Drawing Sheets

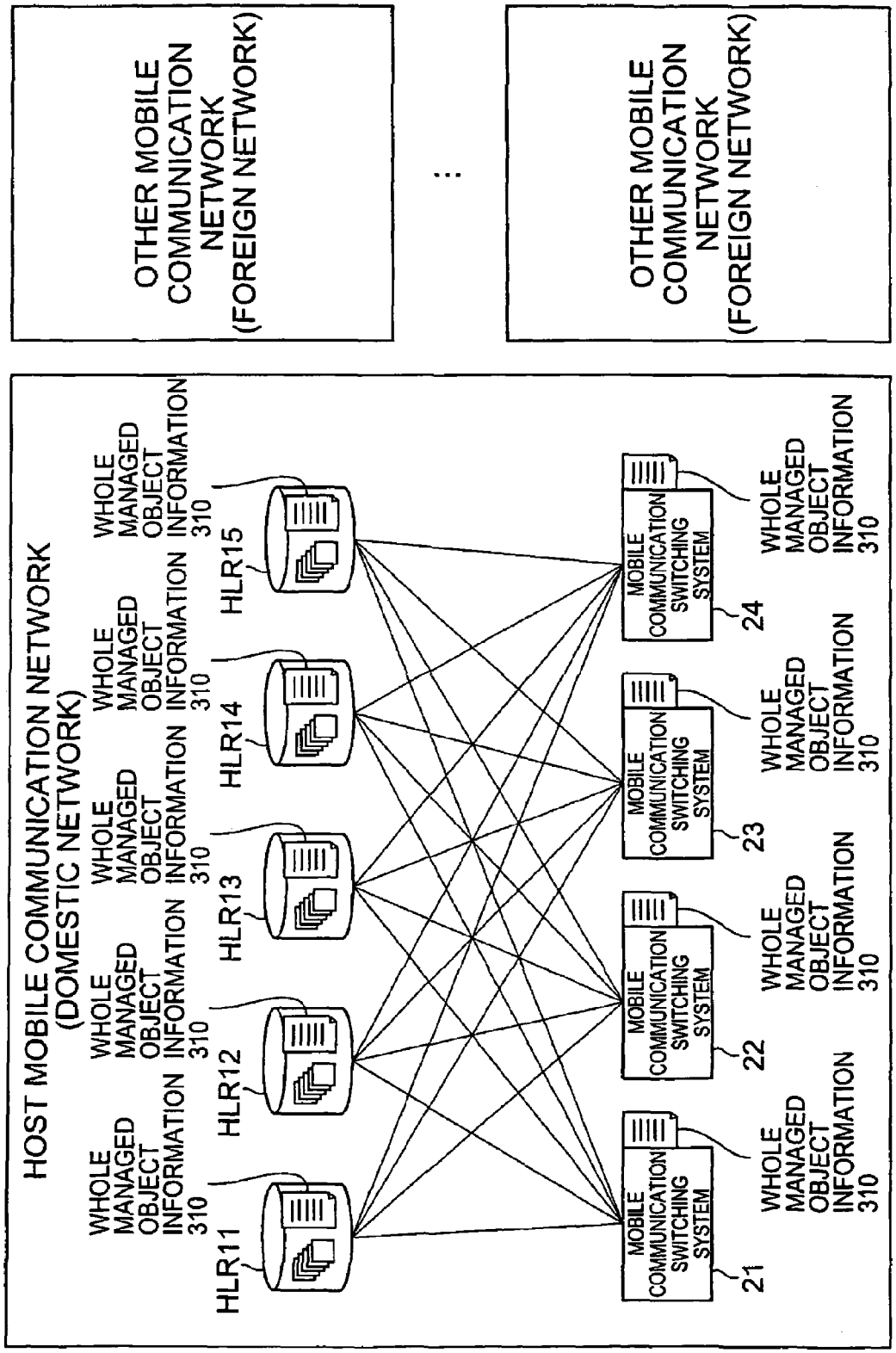

Fig.3A

WHOLE MANAGED OBJECT INFORMATION TABLE (BEFORE TRANSFER) 310

| START NUMBER ID | END NUMBER ID | MANAGER LOCATION REGISTER |
|---|---|---|
| 00000000 | 00999999 | HLR11 |
| 01000000 | 02999999 | HLR12 |
| 03000000 | 03999999 | HLR13 |
| 04000000 | 05999999 | HLR14 |
| 06000000 | 06999999 | HLR15 |

Fig.3B

WHOLE MANAGED OBJECT INFORMATION TABLE (AFTER TRANSFER) 310

| START NUMBER ID | END NUMBER ID | MANAGER LOCATION REGISTER |
|---|---|---|
| 00000000 | 00999999 | HLR11 |
| 01000000 | 02299999 | HLR12 |
| 02300000 | 03999999 | HLR13 |
| 04000000 | 05999999 | HLR14 |
| 06000000 | 06999999 | HLR15 |

Fig.4

ACCOMMODATION IDENTIFICATION TABLE 319

| SUBSCRIBER NUMBER ID | ACCOMMODATION IDENTIFICATION FLAG |
|---|---|
| 01000000 | 1 |
| 01000003 | 0 |
| ⋮ | ⋮ |
| 02999998 | 1 |
| 02999999 | 1 |

Fig.5

FIRST MANAGEMENT TABLE OF
SUBSCRIBER LOCATION INFORMATION          320

| SUBSCRIBER NUMBER ID | LOCATION INFORMATION/ SUBSCRIBER INFORMATION |
|---|---|
| 01000000 | AREA ID #001/KEY ID/SERVICE A |
| 01000004 | AREA ID #003/KEY ID/SERVICE B |
| ⋮ | ⋮ |
| 02999998 | AREA ID #002/KEY ID/SERVICE A |
| 02999999 | AREA ID #005/KEY ID/SERVICE B |

Fig.6

SECOND MANAGEMENT TABLE OF 330
SUBSCRIBER LOCATION INFORMATION

| SUBSCRIBER NUMBER ID | ACCOMMODATION INFORMATION |
|---|---|
| 01000003 | FOREIGN NETWORK #001 |
| 01000010 | FOREIGN NETWORK #004 |
| ⋮ | ⋮ |
| 02999970 | FOREIGN NETWORK #003 |
| 02999995 | FOREIGN NETWORK #001 |

Fig.9 INFORMATION USED IN ACCOMMODATION TRANSFER DETERMINATION

| LOCATION REGISTER | ACCOMMODATION WARNING VALUE | STABLE RANGE | MEMORY CAPACITY (NUMBER OF ACCOMMODABLE USERS) | START NUMBER ID | END NUMBER ID | NUMBER OF ACTUALLY ACCOMMODATED USERS |
|---|---|---|---|---|---|---|
| HLR11 | 95% | 90% | 600000 | 00000000 | 00999999 | 430000 |
| HLR12 | 95% | 90% | 600000 | 01000000 | 02999999 | 580000 |
| HLR13 | 95% | 90% | 700000 | 03000000 | 03999999 | 460000 |

Fig.10

WHOLE MANAGED OBJECT CHANGE INFORMATION 340

| START NUMBER ID | END NUMBER ID | MANAGER LOCATION REGISTER |
|---|---|---|
| 02300000 | 02999999 | HLR13 |

*Fig.11*

SUBSCRIBER LOCATION INFORMATION MANAGEMENT TABLE (CONVENTIONAL) 390

| SUBSCRIBER NUMBER ID | LOCATION INFORMATION/ SUBSCRIBER INFORMATION |
|---|---|
| 01000000 | AREA ID #001/KEY ID/SERVICE A |
| 01000001 | null/null/null |
| 01000002 | null/null/null |
| 01000003 | FOREIGN NETWORK #001/null/null |
| ⋮ | ⋮ |
| 02999998 | AREA ID #002/KEY ID/SERVICE A |
| 02999999 | AREA ID #005/KEY ID/SERVICE B |

LOCATION REGISTER AND ACCOMMODATION TRANSFER CONTROL METHOD

BACKGROUND OF THE INVENTION

1. Field of the Invention

The present invention relates to a location register and accommodation transfer control method. The "location register" in claims, specification, drawings, and abstract in the present application means a location information management system.

2. Related Background Art

In the existing mobile communication systems, location information of each mobile terminal is managed by location registers installed by telecommunications carriers (Home Location Registers (HLRs): e.g., cf. Japanese Patent Application Laid-Open No. 2001-298766 and Japanese Patent Application Laid-Open No. 11-18135). When a mobile communication switching system executes a location registration or location information request of each mobile terminal, a location register as a destination of a control signal is determined based on a correspondence relation between location registers and managed object mobile terminal information prepared in the mobile communication switching system. The correspondence relation between location registers and managed object mobile terminal information is fixedly determined based on number bands of managed object mobile terminals or the like according to processing capacities of apparatus.

SUMMARY OF THE INVENTION

In the determining method based on the number bands of managed object mobile terminals in the location registers according to the above-described conventional technology, however, the system is designed in consideration of memory areas or the like for unaccommodated managed object mobile terminals, as well as those for accommodated managed object mobile terminals. For example, as apparent from a conventional subscriber location information management table 390 shown in FIG. 11, a memory area similar to that for each accommodated subscriber ID (e.g.,: 01000000) was also secured for each unaccommodated subscriber ID (e.g.: 01000002). In addition, a memory area was also secured similarly for each subscriber ID accommodated in another network (e.g.,: 01000003). This posed the problem that the accommodation processing capacity of each location register was not fully exercised.

A mobile communication system is normally provided with a plurality of location registers, and there were desires for a technology of autonomously and efficiently accommodating subscriber management information in a balanced manner in the plurality of location registers.

The present invention has been accomplished in order to solve the above problem and an object of the invention is to provide a location register and accommodation transfer control method capable of autonomously and efficiently accommodating subscriber management information while fully exercising the accommodation processing capacity of each location register.

In order to solve the above problem, a location register according to the present invention is a location register installed in a system environment in which there are a plurality of mobile communication networks, each mobile communication network consisting of a plurality of location registers and at least one switching system, the location register belonging to one mobile communication network, and comprising: whole managed object managing means for storing and managing subscriber number information each defined as a managed object in the system environment, and manager location register information about each location register to manage the subscriber number information, in correspondence to each other; subscriber data managing means for storing and managing subscriber number information each registered as a managed object of the host location register through management by the whole managed object managing means, and subscriber data about a subscriber of the subscriber number, in correspondence to each other; accommodation change determining means for determining whether subscriber management information consisting of the subscriber number information and subscriber data corresponding to the subscriber number information, which is stored and managed by the subscriber data managing means, is to be separated and transferred to one of other location registers, based on criterion information including a data volume of current subscriber management information and an accommodation capacity of the subscriber data managing means; and accommodation transfer determining means for, when the accommodation change determining means determines that the subscriber management information is to be separated, acquiring the criterion information in the other location registers and determining a recipient location register and subscriber management information to be defined as a transferred object, based on the criterion information in each of the host location register and the other location registers and based on a predetermined standard.

An accommodation transfer control method according to the present invention is an accommodation transfer control method in a location register installed in a system environment in which there are a plurality of mobile communication networks, each network consisting of a plurality of location registers and at least one switching system, the location register belonging to one mobile communication network, and comprising: whole managed object managing means for storing and managing subscriber number information each defined as a managed object in the system environment and manager location register information about a location register to manage the subscriber number information, in correspondence to each other; and subscriber data managing means for storing and managing subscriber number information each registered as a managed object of the host location register through management by the whole managed object managing means, and subscriber data about a subscriber of the subscriber number, in correspondence to each other, the accommodation transfer control method comprising: an accommodation change determining step of determining whether subscriber management information consisting of the subscriber number information and subscriber data corresponding to the subscriber number information, stored and managed by the subscriber data managing means, is to be separated and transferred to one of other location registers, based on criterion information including a data volume of current subscriber management information and an accommodation capacity of the subscriber data managing means; and an accommodation transfer determining step of, when the subscriber management information is determined to be separated in the accommodation change determining step, acquiring the criterion information in the other location registers and determining a recipient location register and subscriber management information to be defined as a transferred object, based on the criterion information in each of the host location register and the other location registers and based on a predetermined standard.

In the location register or accommodation transfer control method configured as described above, whether the subscriber management information consisting of the subscriber number information and the subscriber data corresponding to the subscriber number information, stored and managed by the subscriber data managing means, is to be separated and transferred to one of the other location registers is determined based on the criterion information (information including the data volume of the current subscriber management information and the accommodation capacity of the subscriber data managing means); when the subscriber management information is determined to be separated herein, the criterion information in the other location registers is acquired, and the recipient location register and the subscriber management information to be defined as a transferred object are determined based on the criterion information in each of the host location register and the other location registers and based on the predetermined standard. This enables the transfer processing based on the autonomous determination by the location register and the accommodation processing capacity of the location register is fully exercised to accommodate the subscriber management information autonomously and efficiently.

In the location register according to the present invention, preferably, the subscriber data managing means comprises: accommodation identifying means for identifying whether each of the subscriber number information stored and managed by the subscriber data managing means is defined as a managed object by the domestic mobile communication network to which the host location register belongs; a first management table for storing and managing subscriber number information each defined as a managed object by the domestic mobile communication network, and first subscriber data; and a second management table for storing and managing subscriber number information each defined as a managed object by each foreign mobile communication network, and second subscriber data. This configuration uses the first management table and the second management table to separately manage the information in the domestic network and the information in the foreign networks, and thereby enables reduction in a memory storage capacity required.

In the location register according to the present invention, preferably, the location register further comprises transfer notifying means for notifying the recipient location register determined by the accommodation transfer determining means, of the subscriber management information to be defined as a transferred object, determined by the accommodation transfer determining means; the whole managed object managing means updates the subscriber number information and manager location register information stored and managed, based on the recipient location register information and the subscriber management information to be defined as a transferred object, determined by the accommodation transfer determining means; and the subscriber data managing means updates the subscriber management information each defined as a managed object of the host location register, based on the recipient location register information and the subscriber management information to be defined as a transferred object, determined by the accommodation transfer determining means. In this configuration, upon execution of a transfer, the recipient location register is notified of the subscriber management information to be defined as a transferred object, and the whole managed object managing means and the subscriber data managing means of the host location register are able to perform appropriate update management based on the latest information.

In the location register according to the present invention, preferably, the transfer notifying means is configured as follows: the transfer notifying means notifies the switching system comprising means equivalent to the whole managed object managing means of the location register, of the recipient location register information and the subscriber number information to be defined as a transferred object, determined by the accommodation transfer determining means; and as notified, the subscriber number information and manager location register information stored and managed in the switching system is updated. In this configuration, upon execution of a transfer, the switching system is notified of the recipient location register information and the subscriber number information to be defined as a transferred object, and this notification permits the switching system to perform appropriate update management based on the latest information. Namely, it becomes feasible to achieve synchronization of information between the location register and the mobile switching system, whereby it is feasible to efficiently perform transmission/reception processes of an inquiry control signal in the network.

In the location register according to the present invention, preferably, the transfer notifying means is configured as follows: when a transmission request for the recipient location register information and the subscriber number information to be defined as a transferred object, determined by the accommodation transfer determining means, is received from the switching system comprising means equivalent to the whole managed object managing means of the location register, the transfer notifying means notifies the switching system of the determined recipient location register information and subscriber number information to be defined as a transferred object; and as notified, the subscriber number information and manager location register information stored and managed by the switching system is updated. In this configuration, when the transmission request for the recipient location register information and the subscriber number information to be defined as a transferred object is received from the switching system, the transfer notifying means notifies the switching system of the determined recipient location register information and subscriber number information to be defined as a transferred object, and this notification permits the switching system to perform appropriate update management based on the latest information. Namely, it becomes feasible to achieve synchronization of information on an as-needed basis between the location register and the mobile switching system, whereby it is feasible to efficiently perform transmission/reception processes of an inquiry control signal in the network.

In the location register according to the present invention, preferably, the accommodation transfer determining means is configured as follows: for each of the host location register and the other location registers, the accommodation transfer determining means determines an effective accommodation rate equivalent to a percentage of the data volume of the current subscriber management information to the accommodation capacity of the subscriber data managing means, based on the criterion information, and compares the effective accommodation rates of the respective location registers to determine a location register with the smallest effective accommodation rate as the recipient location register. This configuration enables smoothing of loads on the location registers among the location registers, whereby risks of congestion of loads can be spread.

In the location register according to the present invention, preferably, the accommodation transfer determining means is configured as follows: the accommodation transfer determining means determines a total number of subscriber numbers to be transferred, based on the criterion information in the host location register; the accommodation transfer determining means compares bandwidths between a start number band obtained by searching for a number band corresponding to the total number of subscriber numbers to be transferred, in ascending order from a start number of the subscriber number information each having been defined as a managed object of the host location register, and an end number band obtained by searching for a number band corresponding to the total number of subscriber numbers to be transferred, in descending order from an end number of the subscriber number information each having been defined as a managed object of the host location register, and thereby determines a number band with a greater bandwidth, as the subscriber number information to be defined as a transferred object; the accommodation transfer determining means determines a location register managing a number band continuous to the determined number band, as the recipient location register. This configuration increases the accommodation efficiency of the location register and reduces loads due to the number search.

The present invention enables the transfer process based on autonomous determination by the location register and allows the location register to fully exercise its accommodation processing capacity so as to autonomously and efficiently accommodate the subscriber management information.

BRIEF DESCRIPTION OF THE DRAWINGS

FIG. 1 is a diagram showing some of components in a mobile communication network associated with the present invention.

FIG. 3A is a drawing to exemplify contents of a whole managed object information table before a transfer.

FIG. 3B is a drawing to exemplify contents of a whole managed object information table after a transfer.

FIG. 4 is a diagram to exemplify a configuration of an accommodation identification table.

FIG. 5 is a diagram to exemplify a configuration of a first management table of subscriber location information.

FIG. 6 is a diagram to exemplify a configuration of a second management table of subscriber location information.

FIG. 9 is a diagram to exemplify information contents used in accommodation transfer determination.

FIG. 10 is a diagram to exemplify contents of whole managed object change information.

FIG. 11 is a diagram to exemplify a configuration of a subscriber location information management table in a conventional location register.

DESCRIPTION OF THE PREFERRED EMBODIMENTS

An embodiment of the location register and accommodation transfer control method according to the present invention will be described below with reference to the drawings.

[Configurations of Mobile Communication Network and Location Register]

First, a configuration of a mobile communication network according to the present embodiment will be described. FIG. 1 shows components associated with the present embodiment, among components of the mobile communication network. As shown in this FIG. 1, there are a plurality of mobile communication networks of respective companies for providing mobile communication service, and each mobile communication network is constructed including a plurality of location registers (each denoted by "HLR" on the drawings) and at least one mobile communication switching system.

The location registers according to the present embodiment are location registers 11 to 15 shown in FIG. 1 (which will be generally referred to as "location registers 10"), the mobile communication network in which these location registers 10 exist will be referred to as a "domestic network" meaning a mobile communication network of their own, and each one of the other mobile communication networks will be referred to as a "foreign network." In the example of FIG. 1, the domestic network is constructed including the location registers 11-15 and mobile communication switching systems 21-24.

Figure 2A:
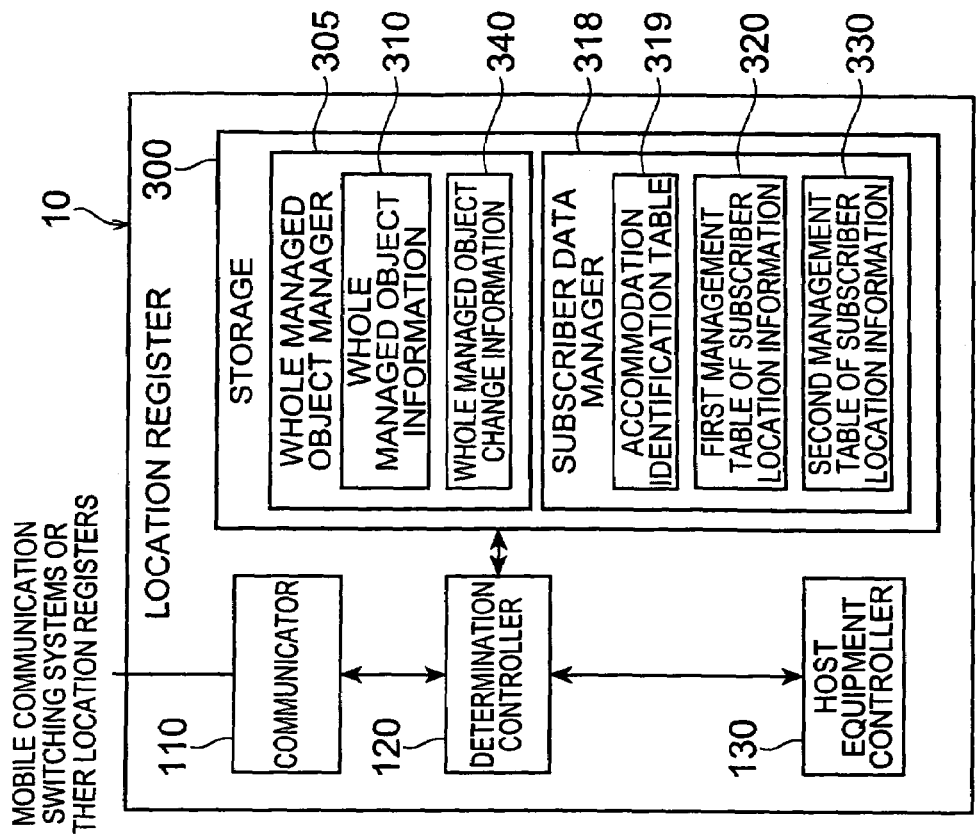
FIG. 2A is a block diagram showing a configuration of a location register according to an embodiment of the invention.

A location register 10 has a configuration shown in FIG. 2A, and is comprised of communicator 110, determination controller 120, host equipment controller 130, and storage 300. Among these components, the communicator 110 executes communications with the mobile communication switching systems 21-24 and with the other location registers. The host equipment controller 130 retrieves and retains a memory size, a load, an accommodation band, the number of accommodated subscribers, etc. of the host location register 10, and provides the information to after-described determination controller 120.

The storage 300 is constructed including a whole managed object manager 305 for managing a whole managed object information table 310 storing subscriber number IDs (corresponding to the subscriber number information in the present invention) and manager location register information about location registers to manage the subscriber number IDs, in correspondence to each other as shown in FIG. 3A, and a subscriber data manager 318 for storing and managing after-described information about subscriber numbers registered in the domestic network or in foreign networks within the band of managed objects of the host location register in the whole managed object information table 310.

Among these, the subscriber data manager 318 is constructed including an accommodation identification table 319 of FIG. 4 storing accommodation identification flags each for identifying whether each of the subscriber number IDs registered in the domestic network or in the foreign networks within the band of managed objects of the host location register is defined as a managed object of the domestic network or as a managed object of a foreign network; a first management table of subscriber location information 320 of FIG. 5 storing subscriber number IDs as managed objects of the domestic network and first subscriber data (e.g., location information and subscriber information) in correspondence to each other; and a second management table of subscriber location information 330 of FIG. 6 storing subscriber number IDs as managed objects of the foreign networks and second subscriber data (e.g., accommodation information) in correspondence to each other. Each of the above tables will be described later.

The above-described first subscriber data and second subscriber data will be generally referred to as "subscriber data." In the description hereinafter "subscriber management information" will generally refer to the subscriber number IDs registered in the domestic network or in the foreign networks in the band of managed objects of the host location register, and the accommodation identification flags, which are stored in the accommodation identification table 319 of FIG. 4, the subscriber number IDs of managed objects of the domestic network and the first subscriber data stored in the first management table of subscriber location information 320 of FIG. 5, and the subscriber number IDs of the managed objects of the foreign networks and the second subscriber data stored in the second management table of subscriber location information 330 of FIG. 6. This subscriber management information is defined as an object to be transferred to another location register with change in the band of managed objects of the host location register in an after-described transfer process.

The determination controller 120 has a function of determining whether the foregoing subscriber management information is to be separated and transferred to another location register, based on criterion information including the numbers of current subscriber number IDs and subscriber data and the accommodation capacity of the subscriber information managing means (the function as the accommodation change determining means of the present invention), and a function of, when separation is determined, acquiring the criterion information in the other location registers and determining a recipient location register, and subscriber number IDs and subscriber data to be defined as transferred objects, based on the criterion information in each of the host location register and the other location registers and based on a predetermined standard (the function as the accommodation transfer determining means of the present invention).

The whole managed object manager 305 corresponds to the whole managed object managing means according to the present invention, and the subscriber data manager 318 to the subscriber data managing means. The accommodation identification table 319 corresponds to the accommodation identifying means according to the present invention, the first management table of subscriber location information 320 to the first management table, and the second management table of subscriber location information 330 to the second management table. The transfer notifying means according to the present invention corresponds to an aggregate of the determination controller 120 and communicator 110.

Each of the tables will be described below with reference to the drawings. As shown in FIG. 3A, the whole managed object information table 310 stores start number IDs and end number IDs indicating bands of subscriber number IDs of mobile communication terminals managed by the respective location registers (each of the location registers 11 to 15). This whole managed object information table 310 is not stored and managed by only the location registers 10, but is also stored and managed by each of the mobile communication switching systems 21-24. In such situations as location registration and origination control from a mobile terminal, each of these location registers 10 and mobile communication switching systems 21-24 specifies a location register to accommodate the mobile terminal, based on the information of the whole managed object information table 310 stored and managed in each device (location register or mobile communication switching system), and executes the control of the location registration or origination request on the location register.

The accommodation identification table 319 shown in FIG. 4 stores the accommodation identification flags for the respective subscriber number IDs to identify whether each subscriber number ID is defined as a managed object of the domestic network. This example uses an accommodation identification flag "1" indicating a managed object of the domestic network, and an accommodation identification flag "0" indicating a managed object of a foreign network.

The first management table of subscriber location information 320 shown in FIG. 5 stores and manages the subscriber number IDs defined as accommodated objects in the domestic network, and the first subscriber data about the subscribers (location information (e.g., predetermined area ID) and subscriber information (e.g., key ID, and service information to be supplied), or the like).

The second management table of subscriber location information 330 shown in FIG. 6 stores and manages subscriber number IDs defined as accommodated objects in foreign networks, and second subscriber data about the subscribers (e.g., IDs of the foreign networks indicating networks accommodating the subscribers).

Since the subscriber data manager 318 is configured to manage the accommodation identification table 319, the first management table of subscriber location information 320 about the accommodated objects of the domestic network, and the second management table of subscriber location information 330 about the accommodated objects of the foreign networks as described above, there is no need for securing a memory capacity for subscriber management information about unaccommodated subscribers and this minimizes the memory areas necessary for the respective subscribers. When a subscriber number ID of a new accommodated object is added, an operation required is just to add the subscriber data about the subscriber. Therefore, addition, deletion, or transfer of subscriber management information (i.e., the subscriber number ID and subscriber data) is executed while restricting a used storage capacity to only a required region.

[Description of Processing Procedure about Accommodation Transfer Control Method]

Figure 7:
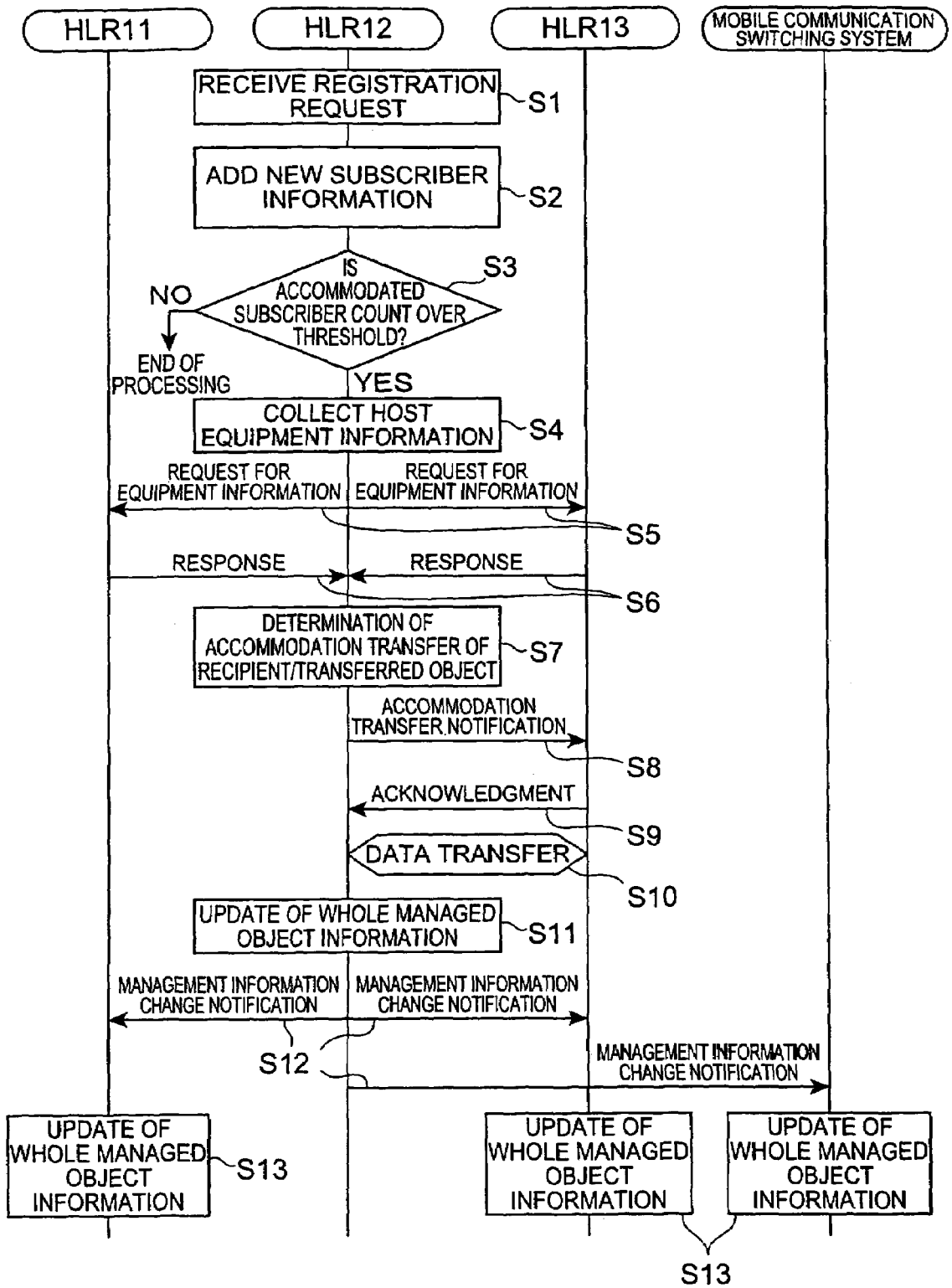
FIG. 7 is a sequence chart showing a transfer processing operation of subscriber management information among location registers according to an embodiment of the present invention.

FIG. 7 shows a processing procedure example of the accommodation transfer control method according to the present invention. The processing procedure example described herein is a procedure in which the subject is the location register 12 and in which the location register 12 autonomously determines the necessity of transfer while exchanging information with adjacent location registers 11, 13 and further determines a recipient location register and transferred objects.

When the location register 12 of the present embodiment receives a registration request for new subscriber management information (S1 in FIG. 7), the subscriber data manager 318 in the location register 12 registers the new subscriber management information (S2). Specifically, when the new subscriber is an accommodated object of the domestic network, the subscriber data manager 318 registers its new subscriber number ID and accommodation identification flag 1 in the accommodation identification table 319 of FIG. 4, and registers the new subscriber number ID and first subscriber data about the subscriber (location information and subscriber information) in the first management table of subscriber location information 320 of FIG. 5. On the other hand, when the new subscriber is an accommodated object of a foreign network, the subscriber data manager 318 registers its new subscriber number ID and accommodation identification flag "0" in the accommodation identification table 319 of FIG. 4, and registers the new subscriber number ID and second subscriber data about the subscriber (accommodation information) in the second management table of subscriber location information 330 of FIG. 6.

Then the host equipment controller 130 retrieves the current number of actually accommodated subscribers in the data manager 318 and provides the information to the determination controller 120. The "number of actually accommodated subscribers" herein means a total number of actually accommodated subscribers in the first management table of subscriber location information 320 and actually accommodated subscribers in the second management table of subscriber location information 330. However, the number of actually accommodated subscribers only in the first management table of subscriber location information 320 may be adopted as the number of actually accommodated subscribers.

The determination controller 120 determines whether the addition at S2 caused the foregoing number of actually accommodated subscribers to exceed a threshold as an accommodation condition, i.e., whether the subscriber management information currently accommodated is to be separated and transferred to another location register (S3). If there is no need for transfer herein, the processing is terminated. This processing step of S3 corresponds to the accommodation change determining step according to the present invention.

On the other hand, when transfer is determined at S3, the host equipment controller 130 collects information of the maximum user number (memory capacity) available for accommodation in the subscriber data manager 318, information of the aforementioned number of actually accommodated subscribers, information of the management number band of the host device stored in the whole managed object information table 310, and information of adjacent location registers, and provides the collected information to the determination controller 120 (S4). In the description hereinafter "equipment information" will refer to the following information pieces among the aforementioned information pieces: the information of the maximum user number (memory capacity) available for accommodation in the subscriber data manager 318, the information of the number of actually accommodated subscribers, and the information of the management number band of the host device stored in the whole managed object information table 310.

Based on the information of the adjacent location registers obtained at S4 from the host equipment controller 130, the determination controller 120 then requests the adjacent location registers 11, 13 in the information to transmit the equipment information in the location registers, through the communicator 110 (S5).

In each of the location registers 11, 13, the determination controller 120 receives the equipment information request from the location register 12 through the communicator 110, the host equipment controller 130 then acquires the equipment information in the device (either of the location registers 11, 13), and the location register transmits the acquired equipment information to the location register 12 (S6).

Then the determination controller 120 of the location register 12 determines a recipient location register, and subscriber management information to be defined as a transferred object, as described below (S7). Let us suppose herein, for example, that the equipment information in each of the location registers collected by the determination controller 120 of the location register 12 was information of a configuration as shown in FIG. 9. In this configuration, an accommodation warning value (95%) and a stable range (90%) of each location register shown in FIG. 9 are assumed as predetermined values. The "accommodation warning value" herein means a limit (threshold) about an effective accommodation rate over which transfer becomes necessary because of an excess number of actually accommodated subscribers, and the "stable range" means a reference value about the effective accommodation rate below which the effective accommodation rate is to be controlled to, for stable network operation.

First, the determination controller 120 divides the number of actually accommodated subscribers in each location register by the memory capacity (the number of accommodable users) to obtain the effective accommodation rate of each location register. In the example of FIG. 9, the effective accommodation rate of location register 11 is 72%, the effective accommodation rate of location register 12 is 97%, and the effective accommodation rate of location register 13 is 66%.

Then the determination controller 120 compares the obtained effective accommodation rates with each other to specify a location register with the lowest effective accommodation rate, and determines the specified location register as a recipient location register. Since the location register 13 has the lowest effective accommodation rate herein, the location register 13 is determined as a recipient location register. On the other hand, concerning the transferred object, since the stable range of the location register 12 is 90%, the number of actually accommodated subscribers in the location register 12 is reduced until the effective accommodation rate of the location register 12 becomes 90%, i.e., until the number of actually accommodated subscribers becomes 540000. Namely, the subscriber management information of 40000 users obtained by subtracting 540000 from the current number of actually accommodated subscribers of 580000 is determined as a transferred object. Specifically, the subscriber management information of 40000 users in the location register 12 in the present state is searched for so as to be continuous to the number band managed by the location register 13 as a recipient location register, to determine a management number band of a transferred object corresponding to the subscriber management information of 40000 users to be defined as the transferred object, and to determine the number of transferred object subscribers (the number of accommodated subscribers in the domestic network and the number of accommodated subscribers in the foreign networks). For example, let us suppose, as shown in FIG. 10, that the management number band from the start number ID of 02300000 to the end number ID of 02999999 was determined as the management number band of the transferred object. The processing step of S7 as described above corresponds to the accommodation transfer determining step according to the present invention.

Then the determination controller 120 of the location register 12 transmits the management number band information of the transferred object and the number of transferred object subscribers (the number of accommodated subscribers in the domestic network and the number of accommodated subscribers in the foreign networks) determined at S7, as an accommodation transfer notification, to the location register 13 as a recipient location register (S8).

In the location register 13, when the determination controller 120 receives the accommodation transfer notification, it transfers the accommodation transfer notification to the host equipment controller 130, and the host equipment controller 130 secures a memory area or the like in the host device. After completion of securing the memory area, the location register 13 transmits an accommodation transfer notification acknowledgment as a response to the transfer notification, to the location register 12 (S9).

After receiving the accommodation transfer notification acknowledgment, the location register 12 transfers the subscriber management information of the transferred object to the location register 13 (S10). Namely, the subscriber management information corresponding to the transferred band is transmitted together to the location register 13.

After completion of the data transfer, the whole managed object manager 305 in the location register 12 updates the whole managed object information 310 shown in FIG. 3A to that as shown in FIG. 3B, based on the temporarily stored whole managed object change information 340 (cf. FIG. 10) (S11). Namely, the management number band from the start number ID of 02300000 to the end number ID of 02999999 in the whole managed object information 310 is transferred from the location register 12 to the location register 13.

Furthermore, the location register 12 notifies the other location registers 11, 13-15 of the whole managed object change information 340 and also notifies the mobile communication switching systems 21-24 similarly of the whole managed object change information 340 (S12). Each device receiving the notification of the whole managed object change information 340 updates the whole managed object information 310 managed in itself (S13). This results in updating the whole managed object information 310 on the basis of the same whole managed object change information 340 in the location registers 11-15 and in the mobile communication switching systems 21-24, and thus all the devices are able to maintain the same as the contents of the whole managed object information 310 and to perform appropriate update management. Namely, it becomes feasible to achieve synchronization of information among the location registers and the mobile switching systems, and to efficiently achieve transmission/reception processes of an inquiry control signal in the network.

The embodiment described above enables the transfer process based on the autonomous determination by the location register, whereby the accommodation processing capacity of the location register can be fully exercised to autonomously and efficiently accommodate the subscriber management information. It is also feasible to achieve smoothing of loads on the location registers among the location registers, and thus risks of load congestion can be spread.

Since the first management table of subscriber location information 320 and the second management table of subscriber location information 330 are used to separately manage the subscriber information about subscribers in the domestic network and about subscribers in the foreign networks, the memory storage capacity required can be reduced.

On the occasion of executing the transfer, the management number band information of the transferred object and the number of transferred object subscribers (the number of accommodated subscribers in the domestic network and the number of accommodated subscribers in the foreign networks) are transmitted as the accommodation transfer notification to the recipient location register, and the whole managed object manager 305 of the host location register performs the appropriate update management to the latest whole managed object information.

Figure 2B:
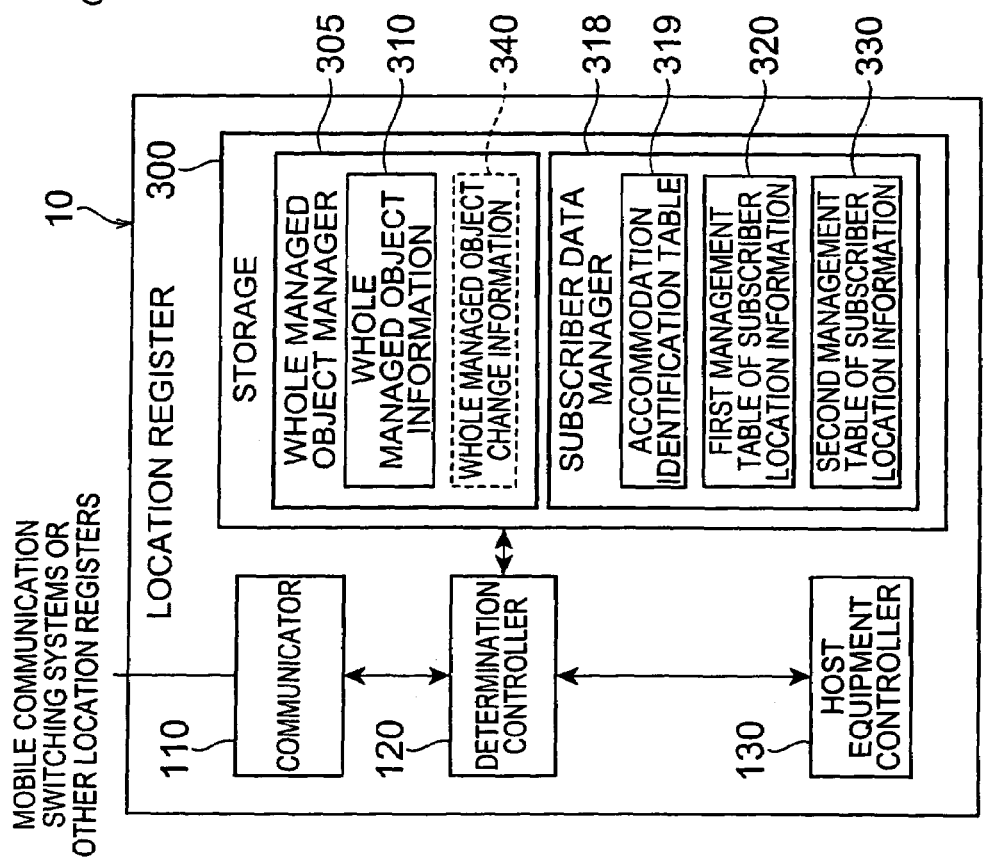
FIG. 2B is a block diagram showing a modification example of FIG. 2A.

S12 in FIG. 7 shows the example of performing the management information change notification to the other location registers and to each of the mobile communication switching systems, but it is also possible to adopt another management information change notification method of carrying out the management information change notification to a mobile switching system when the mobile switching system transmits an inquiry of the band corresponding to the whole managed object change information 340 of FIG. 10. Namely, it is also possible to adopt a setup, as shown in FIG. 2B, wherein the whole managed object manager 305 in the location register 10 retains the whole managed object change information 340 of FIG. 10 and wherein, when a mobile switching system sends an inquiry of the band corresponding to the whole managed object change information 340, the manager 305 transmits the management information change notification to the mobile switching system.

Figure 8:
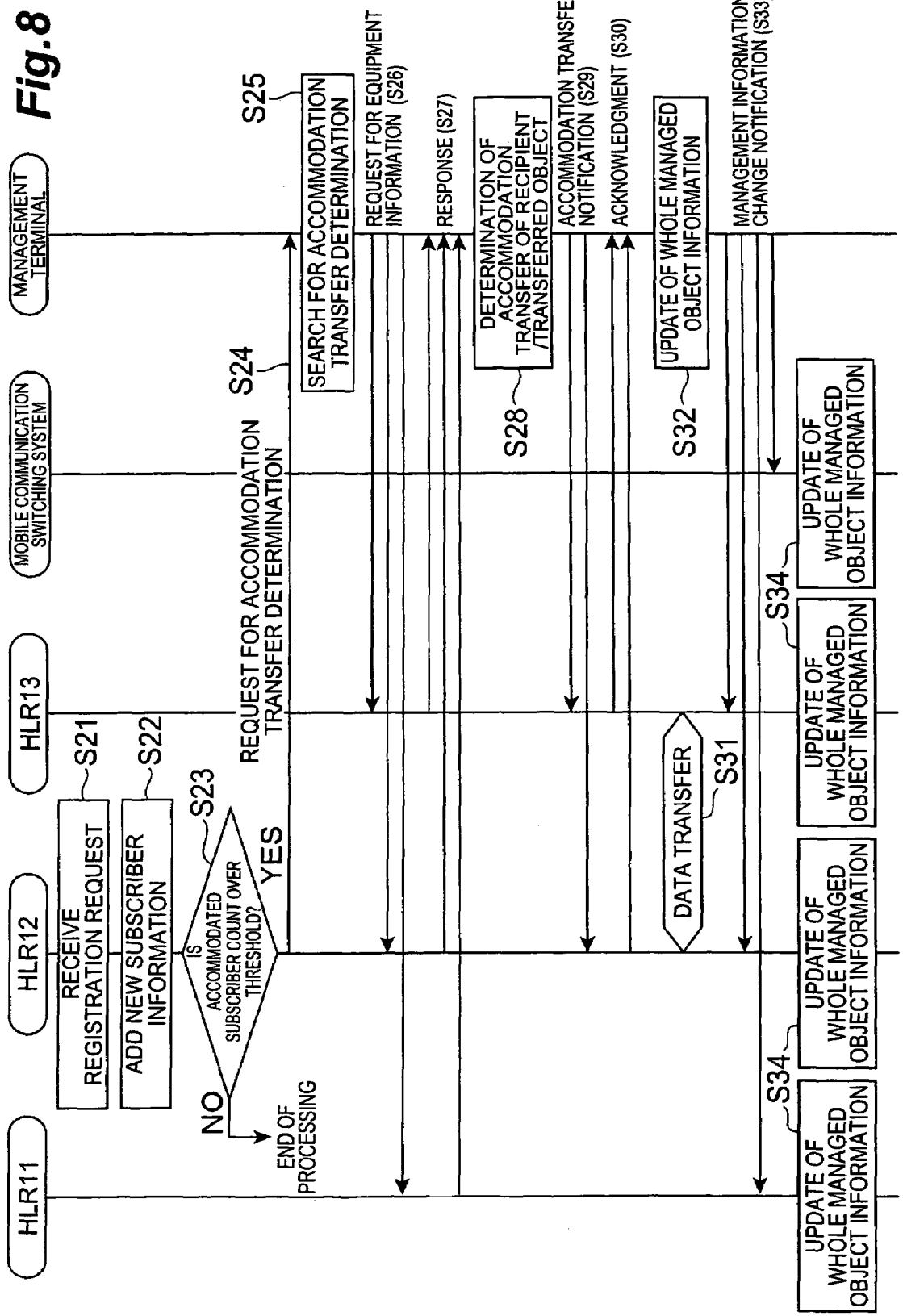
FIG. 8 is a sequence chart showing a transfer processing operation of subscriber management information among location registers executed by a management terminal.

It is also possible to adopt a configuration in which another management system different from the location registers executes the accommodation transfer determination, as shown in FIG. 8. The processing of FIG. 8 will be described below.

When the location register 12 according to the present embodiment receives a registration request for new subscriber management information (S21 in FIG. 8), the subscriber data manager 318 in the location register 12 registers the new subscriber management information (S22). The contents of the processing at S22 are the same as those at the aforementioned step S2 in FIG. 7. Then the host equipment controller 130 retrieves the current number of actually accommodated subscribers in the data manager 318 and provides the information to the determination controller 120. The determination controller 120 determines whether the addition at S22 caused the foregoing number of actually accommodated subscribers to exceed the threshold as an accommodation condition, i.e., whether the subscriber management information currently accommodated is to be separated and transferred to another location register (S23). If there is no need for transfer, the processing is terminated.

On the other hand, when transfer is determined at S23, an accommodation transfer determination request is transmitted from the location register 12 to a management terminal (S24). The management terminal, receiving the accommodation transfer determination request, first performs a search (information collection) for the accommodation transfer determination (S25). It is assumed herein that the management terminal already has the "adjacent location register information (location registers 11, 13)" to the location register 12 having sent the accommodation transfer determination request. Based on the adjacent location register information, the management terminal then requests each of the adjacent location registers 11, 13 in the information and the location register 12 to transmit the equipment information (the maximum user number (memory capacity) information available for accommodation in the subscriber data manager 318, the information of the number of actually accommodated subscribers, and the management number band information of the host device stored in the whole managed object information table 310) similar to that in the foregoing processing of FIG. 7 (S26).

In each of the location registers 11, 12, and 13, the determination controller 120 acquires the equipment information in the device by the host equipment controller 130, and transmits the acquired equipment information to the management terminal (S27).

Then the management terminal determines the recipient location register and the subscriber management information to be defined as a transferred object, in accordance with a procedure similar to the aforementioned processing of S7 in FIG. 7 (S28). It is assumed herein that the location register 13 is determined as a recipient location register, that the management number band from the start number ID of 02300000 to the end number ID of 02999999 is determined as a management number band of a transferred object as shown in FIG. 10, and that the management number band information of the transferred object and the number of transferred object subscribers (the number of accommodated subscribers in the domestic network and the number of accommodated subscribers in the foreign networks) are determined.

Then the management terminal transmits the management number band information of the transferred object and the number of transferred object subscribers (the number of accommodated subscribers in the domestic network and the number of accommodated subscribers in the foreign networks) as an accommodation transfer notification to the source location register 12 and to the recipient location register 13 (S29).

When each of the location registers 12, 13 receives the accommodation transfer notification, it performs a preparation for data transfer (e.g., securing of a memory area or the like). When the preparation is done, an accommodation transfer notification acknowledgment is transmitted to the management terminal (S30). Thereafter, the subscriber management information of the transferred object is transferred from the location register 12 to the location register 13 (S31). Namely, the subscriber management information corresponding to the transferred band is transmitted together from the location register 12 to the location register 13.

The management terminal updates the whole managed object information 310 shown in FIG. 3A to that as shown in FIG. 3B, based on the whole managed object change information 340 (cf. FIG. 10) in itself (S32). Namely, the management number band from the start number ID of 02300000 to the end number ID of 02999999 in the whole managed object information 310 is transferred from the location register 12 to the location register 13.

Furthermore, the management terminal notifies the location registers 11-15 of the whole managed object change information 340 and also notifies the mobile communication switching systems 21-24 similarly of the whole managed object change information 340 (S33). When receiving the notification of the whole managed object change information 340, each device updates the whole managed object information 310 managed in itself (S34).

In the processing form of FIG. 8 as described above, i.e., in the form of carrying out the accommodation transfer determination in the management system different from the location registers, the subscriber management information can be efficiently accommodated while fully exercising the accommodation processing capacity of each location register.

It is also possible to adopt various forms as described below, as processing forms of the transfer. For example, after transmission of the accommodation transfer notification acknowledgment, the recipient location register 13 requests the source location register 12 to send each piece of the subscriber management information of the transferred object at a time, so as to implement the transfer. The transfer can also be implemented by sending pieces of the subscriber management information of the transferred object one by one from the source location register 12 to the recipient location register 13. The transfer can also be executed during a period in which the processing load is low on both or one of the source location register 12 and the recipient location register 13.

Furthermore, a method as described below can also be adopted as a method of determining a recipient of the transferred object. The determination controller 120 determines the total number of subscriber numbers to be transferred (total transfer number), then compares bandwidths between a start number band obtained by searching for a number band corresponding to the total transfer number, in ascending order from the start number in the number band of subscriber number IDs of managed objects in the host location register and an end number band obtained by searching for a number band corresponding to the total transfer number, in descending order from the end number in the number band of subscriber number IDs of managed objects in the host location register, determines a number band with a greater bandwidth as subscriber number IDs to be defined as transferred objects, and determines a location register managing the number band continuous to the determined number band, as a recipient location register. This configuration enables further reduction in the loads for the accommodation efficiency enhancement and number search of the location register.

The disclosure of Japanese Patent Application No. 2005-241353 filed on Aug. 23, 2005 including specification, drawings and claims is incorporated herein by reference in its entirety.

What is claimed is:

1. A location register installed in a system environment in which there are a plurality of mobile communication networks, each mobile communication network consisting of a plurality of location registers and at least one switching system, said location register belonging to one mobile communication network, and comprising:

whole managed object managing means for storing and managing a first plurality of subscriber number information which are defined as managed objects in the system environment, and manager location register information about each location register to manage respective ones of the first plurality of subscriber number information, the first plurality of subscriber number information being stored in correspondence with the manager location register information;

subscriber data managing means for storing and managing a second plurality of subscriber number information which are registered as managed objects of the location register through management by the whole managed object managing means, and subscriber data about a subscriber of a respective one of the second plurality of subscriber number information, the second plurality of subscriber number information being stored in correspondence with the subscriber data;

accommodation change determining means for determining whether subscriber management information consisting of subscriber number information from the second plurality of subscriber number information and corresponding subscriber data, which is stored and managed by the subscriber data managing means, is to be deleted from the location register and transferred to one of other location registers, based on criterion information including a data volume of current subscriber management information and an accommodation capacity of the subscriber data managing means; and accommodation transfer determining means for, when the accommodation change determining means determines that the subscriber management information is to be transferred, acquiring the criterion information in said other location registers and determining a recipient location register and subscriber management information to be defined as a transferred object, based on the criterion information in each of the location register and said other location registers and based on a predetermined standard, wherein the accommodation transfer determining means determines a total number of subscriber number information from the second plurality of subscriber number information to be transferred by determining a number band to be transferred, the number band being a range of numbers within the second plurality of subscriber number information which encompasses the determined total number of subscriber number information to be transferred, the determined number band having either a lowest number of the second plurality of subscriber number information being the starting number of the number band or having the highest number of the second plurality of the subscriber number information being the ending number of the number band.

2. The location register according to claim 1, wherein the subscriber data managing means comprises:

accommodation identifying means for identifying whether each of the second plurality of subscriber number information stored and managed by the subscriber data managing means is defined as a managed object by the domestic mobile communication network to which the location register belongs;

a first management table for storing and managing a third plurality of subscriber number information, each defined as a managed object by the domestic mobile communication network, and first subscriber data; and a second management table for storing and managing a fourth plurality of subscriber number information, each defined as a managed object by each foreign mobile communication network, and second subscriber data.

3. The location register according to claim 1, said location register further comprising:

transfer notifying means for notifying the recipient location register determined by the accommodation transfer determining means, of the subscriber management information to be defined as a transferred object, determined by the accommodation transfer determining means;

wherein the whole managed object managing means updates the first plurality of subscriber number information and manager location register information stored and managed, based on the recipient location register information and the subscriber management information to be defined as a transferred object, determined by the accommodation transfer determining means, and wherein the subscriber data managing means updates the subscriber management information based on the recipient location register information and the subscriber management information to be defined as a transferred object, determined by the accommodation transfer determining means.

4. The location register according to claim 3, wherein the transfer notifying means is configured to notify a switching system, which comprises means equivalent to the whole managed object managing means of the location register, of the recipient location register information and the subscriber number information to be defined as a transferred object, determined by the accommodation transfer determining means, and when the switching system is notified, the subscriber number information and manager location register information stored and managed in the switching system are updated.

5. The location register according to claim 3, wherein when the transfer notifying means receives a transmission request for the recipient location register information and the subscriber number information to be defined as a transferred object, determined by the accommodation transfer determining means, from the switching system, which comprises means equivalent to the whole managed object managing means of the location register, the transfer notifying means notifies the switching system of the determined recipient location register information and subscriber number information to be defined as a transferred object; and when the switching system is notified, the subscriber number information and manager location register information stored and managed by the switching system are updated.

6. The location register according to claim 1, wherein for each of the location register and the other location registers, the accommodation transfer determining means determines an effective accommodation rate equivalent to a percentage of the data volume of the current subscriber management information to the accommodation capacity of the subscriber data managing means, based on the criterion information, and compares the effective accommodation rates of the respective location registers to determine a location register with the smallest effective accommodation rate as the recipient location register.

7. The location register according to claim 1, wherein the accommodation transfer determining means determines the number band to be transferred by comparing bandwidths between a start number band, which has the total number of subscriber number information to be transferred and has the lowest number of the second plurality of subscriber number information as a starting number, and an end number band, which has the total number of subscriber number information to be transferred and has the highest number of the second plurality of subscriber number information as an ending number and determines a number band with a greater bandwidth from among the start number band and the end number band, as the number band to be transferred;

the accommodation transfer determining means determines a location register managing a number band continuous to the determined number band, as the recipient location register.

8. The location register according to claim 1, wherein the accommodation transfer determining means determines a location register managing a number band continuous to the determined number band, as the recipient location register.

9. An accommodation transfer control method in a location register installed in a system environment in which there are a plurality of mobile communication networks, each network consisting of a plurality of location registers and at least one switching system, said location register belonging to one mobile communication network, and comprising: whole managed object managing means for storing and managing a first plurality of subscriber number information which are defined as managed objects in the system environment and manager location register information about a location register to manage respective ones of the first plurality of subscriber number information, the first plurality of subscriber number information being stored in correspondence with the manager location information; and subscriber data managing means for storing and managing a second plurality of subscriber number information which are registered as managed objects of the location register through management by the whole managed object managing means, and subscriber data about a subscriber of a respective one of the second plurality of subscriber number information, the second plurality of subscriber number information being stored in correspondence with the subscriber data, the accommodation transfer control method comprising:

an accommodation change determining step of determining, at the location register, whether subscriber management information consisting of subscriber number information from the second plurality of subscriber number information and corresponding subscriber data, stored and managed by the subscriber data managing means, is to be deleted from the location register and transferred to one of other location registers, based on criterion information including a data volume of current subscriber management information and an accommodation capacity of the subscriber data managing means; and an accommodation transfer determining step of, when the subscriber management information is determined to be transferred in the accommodation change determining step, acquiring the criterion information in said other location registers and determining a recipient location register and subscriber management information to be defined as a transferred object, based on the criterion information in each of the location register and said other location registers and based on a predetermined standards, wherein the accommodation transfer determining step includes determining a total number of subscriber number information from the second plurality of subscriber number information to be transferred by determining a number band to be transferred, the number band being a range of numbers within the second plurality of subscriber number information which encompasses the determined total number of subscriber number information to be transferred, the determined number band having either a lowest number of the second plurality of subscriber number information being the starting number of the number band or having the highest number of the second plurality of the subscriber number information being the ending number of the number band.

* * * * *